United States Patent
Jaiswal et al.

(10) Patent No.: US 8,797,900 B2
(45) Date of Patent: Aug. 5, 2014

(54) AUTOMATIC WEB CONFERENCE PRESENTATION SYNCHRONIZER

(75) Inventors: Peeyush Jaiswal, Boca Raton, FL (US); Aleksas Joseph Vitenas, Tinton Falls, NJ (US)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 13/350,880

(22) Filed: Jan. 16, 2012

(65) Prior Publication Data

US 2013/0182063 A1 Jul. 18, 2013

(51) Int. Cl.
*G01R 31/08* (2006.01)

(52) U.S. Cl.
USPC .......................................................... 370/252

(58) Field of Classification Search
CPC ..... H04L 12/1827; H04L 67/02; G01R 31/08
USPC ....................................................... 370/252
See application file for complete search history.

(56) References Cited

U.S. PATENT DOCUMENTS

| | | | | |
|---|---|---|---|---|
| 6,161,009 | A * | 12/2000 | Skurdal et al. | 455/423 |
| 7,290,178 | B2 * | 10/2007 | Rothman et al. | 714/39 |
| 8,208,922 | B1 * | 6/2012 | Khanka et al. | 455/436 |
| 2003/0235163 | A1 * | 12/2003 | Montz et al. | 370/331 |
| 2006/0271624 | A1 | 11/2006 | Lyle et al. | |
| 2007/0271335 | A1 | 11/2007 | Bostick et al. | |
| 2010/0069126 | A1 * | 3/2010 | Wang et al. | 455/574 |
| 2010/0218120 | A1 | 8/2010 | Gaurav et al. | |
| 2013/0103830 | A1 * | 4/2013 | Edwards et al. | 709/224 |
| 2013/0308461 | A1 * | 11/2013 | Stanwood et al. | 370/235 |
| 2013/0336226 | A1 * | 12/2013 | Noh et al. | 370/328 |

* cited by examiner

*Primary Examiner* — Mohammad Islam
(74) *Attorney, Agent, or Firm* — Whitham, Curtis, Christofferson & Cook, P.C.; John R. Pivnichny

(57) ABSTRACT

A beacon signal including image information and an application to cause acknowledgment of receipt of the beacon signal is transmitted in order to measure approximate latency in transmission over a communication link that exhibits latency such as a packet switched digital network. Transmission latency for image information for an image included in a web conference is then estimated and elapsed time after transmission of such image information is measured and an indication provided to a presenter or conference monitor when the image should be visible to a conference participant which can be easily selected by the presenter.

20 Claims, 4 Drawing Sheets

AUTOMATIC WEB CONFERENCE PRESENTATION SYNCHRONIZER

FIELD OF THE INVENTION

The present invention generally relates to transmission of graphic information to a plurality of users over networks such as the Internet and, more particularly, to synchronizing the presentation of such graphic information with a presentation conducted by teleconference.

BACKGROUND OF THE INVENTION

In recent years, teleconferencing using telephone or other networks such as the Internet has become a convenient, time-saving and commonly used alternative to face-to-face meetings during which information is conveyed and/or business conducted. Such teleconferencing is often used for educational purposes and, importantly, sales presentations to potential customers. Therefore, it is important that such teleconferences be carried out in a smooth and expeditious manner.

As telecommunication techniques have developed, it has become common and found to be most economical to conduct voice communications over special telephone connection arrangements and to provide graphical information through network-connected computers such as so-called personal computers, laptop computers, palm-top device, smart phones and the like which are networked through the Internet or private networks that may or may not include wireless links. While analog or digital telephony is capable of substantially instantaneous communications, the same is not true for information transmitted digitally over networks, particularly for graphic or text information, where significant delay or latency can occur.

Such delay or latency, or at least a major portion thereof, is generally due to the manner in which packetized information is handled by the network to achieve high efficiency and degree of utilization of the network in order to accommodate a maximized amount of simultaneously transmitted information. To achieve high efficiency and degree of network utilization, the information to be transmitted is divided into packets and each packet is divided into a header portion and a payload portion that are associated with each other throughout the communication. The header portion contains information in regard to the intended destination, a message identifier and a packet number. The payload portion contains a respective portion of the information to be transmitted. With such header and payload information contained in each packet, it becomes irrelevant to the transmission whether the individual packets are transmitted over the same or different interconnection routes or whether or not the packets are received in order. The packet is simply stored, as received, and the information re-assembled incrementally and in the order specified by the packet number for a particular message until the message is complete. Therefore, the delay or latency which can occur is at least the sum of the longest transmission time of any packet in the message and the time for the message to be re-assembled and read out of the memory in which it is collected and re-assembled. For image information, a portion of the delay may also be due to the time and processing required to render the image using the hardware and software available. Thus the total delay or latency can range from a fraction of a second to several tens of minutes.

The delay or latency is often substantially transparent to users of the network when there is no real-time indication to the intended recipient of the transmission of the message. However, when the message is accompanied by a parallel substantially instantaneous communication by telephony or the like, the recipient generally has a frame of reference for the transmission and a degree of synchronization of the two communication links is required. Such synchronization is usually achieved by simply waiting until the receipt of graphic or text message is acknowledged by all participants to resume the voice link communication. The only alternative is to proceed with a presentation even though the associated graphic information may not be available to all participants, possibly for an extended period of time. Further, the need to transmit and process acknowledgments may delay the presentation beyond the time when graphic information has become available to all participants. Such unavoidable interruptions and delays clearly reduce the quality and effectiveness of the teleconference, unnecessarily increase the teleconference duration and have a strong adverse impact on the effect made by the presenter, particularly for purposes of sales.

SUMMARY OF THE INVENTION

It is therefore an object of the present invention to provide a method and apparatus for reducing delays and corresponding distractions for inexact synchronization between communication channels utilized in teleconferences.

In order to accomplish these and other objects of the invention, a method for synchronizing presentation of content of a web conference over a real-time communication link with content over another communication link which includes data latency is provided including steps of transmission of a beacon message containing image data and software for transmitting an acknowledgment of receipt of said image data to determine approximate latency time of said another communication link, sending a web conference image, determining elapsed time subsequent to sending of the web conference image, and displaying an indication to a web conference presenter when the elapsed time equals or exceeds a time corresponding to the approximate latency time.

In accordance with another aspect of the invention, an apparatus for conducting a web conference is provided comprising a transmitter to transmit an audio portion of the web conference over a communication link, a transmitter to transmit image information of the web conference over another communication link exhibiting latency, a generator to transmit a beacon signal over the communication link exhibiting latency, a processor to determine approximate latency of the beacon signal in the communication link exhibiting latency, a timer for measuring elapsed time from transmission of image information, and a display, responsive to the timer for indicating when the elapsed time equals or exceeds the approximate latency.

In accordance with a further aspect of the invention, a method for synchronizing presentation of content of a web conference over a real-time communication link with content over another communication link which includes data latency is provided, including steps of configuring a data processor to provide a transmitter to transmit image information of said web conference over another communication link exhibiting latency, configuring a data processor to provide a generator to transmit a beacon signal over the communication link exhibiting latency, configuring a data processor to provide a processor to determine approximate latency of the beacon signal in the communication link exhibiting latency, configuring a data processor to provide a timer for measuring elapsed time from transmission of image information, and displaying, responsive to the timer, an indication of when the elapsed time equals or exceeds the approximate latency.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
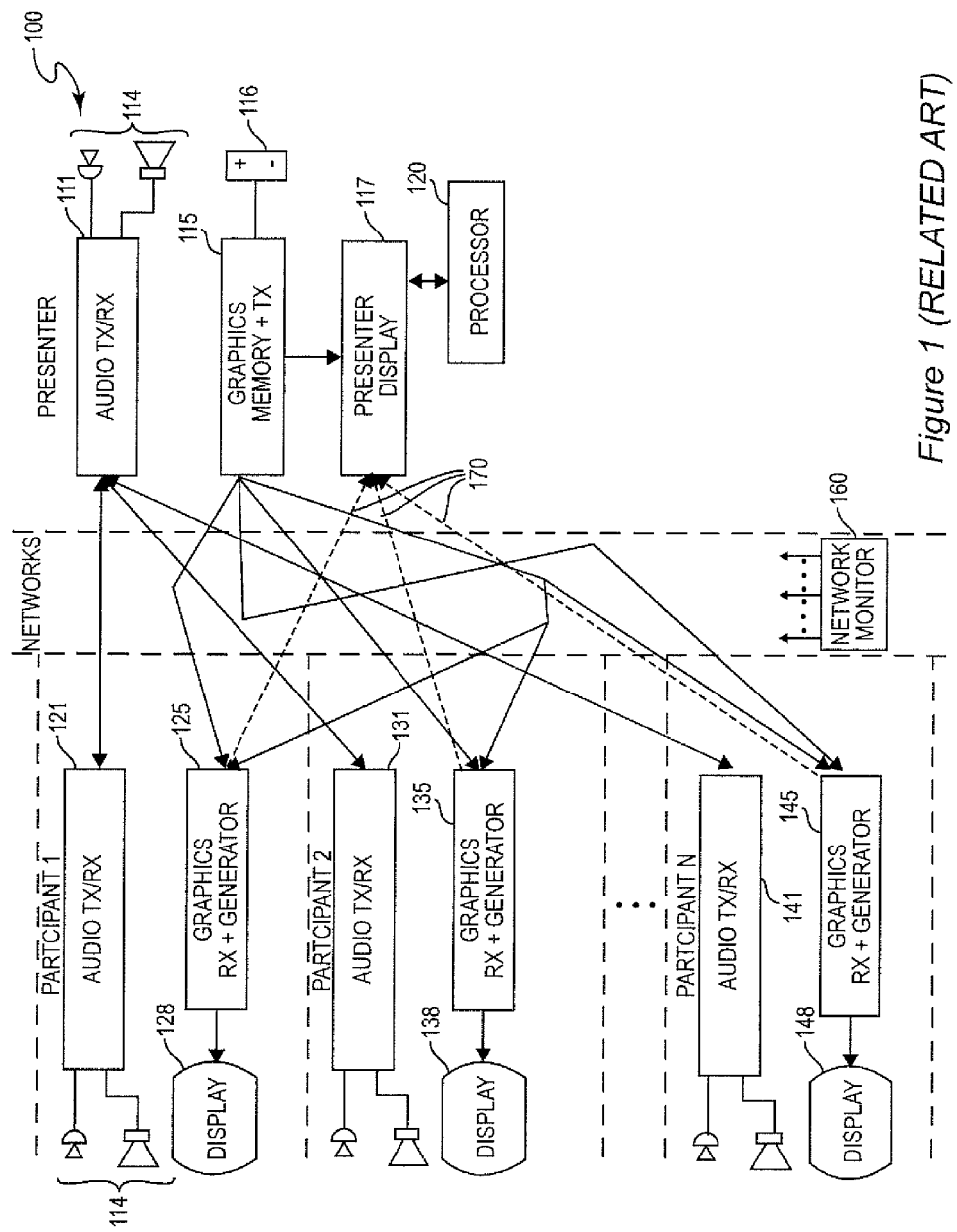
FIG. 1 is a schematic diagram of a teleconference environment in which the invention has particular utility.

Referring now to the drawings, and more particularly to FIG. 1, there is shown, in highly schematic form, a web conference environment 100 in which the invention has particular utility. Since FIG. 1 is arranged to facilitate an understanding of the invention and the problem addressed thereby, no portion of FIG. 1 is admitted to be prior art in regard to the present invention even though the invention is not represented therein. Accordingly, FIG. 1 has been designated and labeled as "Related Art".

It will be noted that FIG. 1 is divided (by dashed lines) into three sections representing a presenter station and an arbitrary number of participant stations connected by one or more networks comprising various communication links, respectively. The presenter station comprises an audio transmitter and receiver 111 having at least one input (schematically represented by a microphone) and at least one output (schematically represented by a speaker), collectively indicated at 114. (Such inputs and outputs should also be understood to include other types of devices such as recording and playback devices and/or control arrangements responsive to audio or other types of signals that may be communicated by a communication link also suitable for telephony (e.g. so-called voice over Internet protocol (VoIP).) The presenter station will also include a graphics memory and transmitter 115 (commonly embodied by a computer or processor 120 that can also provide hardware and software for providing the audio transmitter/receiver and inputs and outputs therefor and other functions as may be desired) and a control 116 through which the presenter can incrementally control the preferably ordered transmission of images to participants in the web conference. Display 117 is normally provided to display the current, most recently transmitted image or, alternatively for an image previously transmitted and stored locally to a participant, the image most recently ordered, by the presenter, to be displayed to participants at respective participant stations. Many different display formats such as split screen formats showing, for example, a current and a subsequent transmitted image or an array of so-called thumbnail images, possibly also indicating a current and/or "next" image and capability for magnification of either or both images, are available or foreseeable in the art and details thereof are unimportant to the successful practice of the invention but can be chosen or developed at will.

Similarly, the participant stations will each usually include an audio transmitter and receiver 121, 131, 141 with corresponding inputs and outputs 114 similar to those described above and which may be provided by infrastructure suitable for telephony. Alternatively, the audio transmitter/receiver may be provided by the same hardware and software of a computer (e.g. desktop, laptop, palmtop, personal digital assistant (PDA), smart phone or the like using a wired and/or wireless telephony link) which also communicates over a digital network such as the Internet to provide a graphics receiver and image generator 125, 135, 145 to receive image data and develop signals which cause the image to be displayed on respective displays 128, 138, 148.

It should also be appreciated from the illustration in FIG. 1 that each of the presenter audio transmitter/receiver 111 and presenter graphics memory and transmitter 115 are individually connected through one or more networks to each of the corresponding structures at each of the participant stations as depicted by arrows and that the arrows indicate potentially different networks are utilized for these respective communications. Specifically, the network connections between the audio transmitter/receiver of the presenter station and each of the participant stations are depicted as straight bidirectional arrows indicating not only the preferable facility for bidirectional communications but also that these communications may be conducted with substantially no latency as is appropriate to voice telephony. In contrast, communications from the graphics memory and transmitter of the presenter station to each of the graphics receiver and image generators at the respective participant station are angled and duplicated in whole or in part to indicate that respective packets of graphics information are typically unidirectional transmissions and routed through digital network connections as may be most conveniently available within the available network(s), as determined by network monitor 160 (the details of which are not important to the successful practice of the invention) such that they may be differently routed, received in an arbitrary order and reassembled into the image information, as transmitted. As alluded to above, a delay or image latency generally results from handling information in such a manner which is necessitated by the generally greater information content and longer required transmission times for image information in view of the need for efficient network utilization and the nature of graphic information, itself. Further, once received, the graphics information need not only be reassembled into a given message and the message checked for completeness, but the information therein must be processed to develop signals that can produce an image on a display device. Such processing is generally referred to as "rendering" and requires not only a significant but highly variable duration of time to perform; depending on image data file (or data compression) type, image complexity, and available processing hardware and software. Nevertheless, rendering can usually be accomplished by processors of reasonably current design within a few seconds. Therefore, the respective communication links for graphics information and communication links between the audio transmitter/receivers will be inherently unsynchronized and, further, the latency of graphics data will be particularly evident from the lack of synchronization with the playout of data from the participant audio transmitter/receivers. The corresponding distraction to participants can be readily understood. Moreover, a presenter may wish to be substantially certain that an image is available to all participants or at least some select participants (such as a potential customer to which the presentation is principally directed) before beginning discussion of that image and to be assured that any lack of synchronization is only minimally perceptible. On the other hand, presentation of an image while discussion of a previous image continues clearly constitutes a substantial distraction, as well, since the presenter may be making a final, important observations in regard to the image previously displayed.

While several approaches to this problem of synchronization of audio and graphics transmitted differently over different communication channels have been proposed, none has proven entirely successful or acceptable. Most such approaches appear to rely upon acknowledgments of receipt of graphics messages sent from participant stations to the presenter station as shown by dashed lines 170 of FIG. 1, calculating the transmission time for the graphics massage to the participant stations and possibly generating a metric based on the acknowledgments or calculated transmission time, such as the projection of a percentage of participants to whom the graphic is actually displayed at a given point in time, that the presenter can utilize in timing the start of segments of the presentation to approximately match the timing of the graphics actually displayed at the participant stations.

One problem with such arrangements arises in the calculation of the transmission time for the graphics information since the communication time is not instantaneous for either the graphics information or the acknowledgment, particularly since the acknowledgment could be routed differently from the graphics data in the digital network and since the reassembly time of the graphics and acknowledgment messages are likely to be markedly different, if, indeed, any reassembly time is required for the acknowledgment message. Therefore, while the transmission time for the graphics message will certainly be less than the interval between transmission of the graphics message and the acknowledgment, the fraction of the interval required for transmission of the graphics message will clearly not be constant.

Further, a reception acknowledgment should not be sent until the reception is verified to be complete and correct; possibly requiring re-transmission and, in any event, adding latency to the acknowledgment. Even sending a time-stamp of the completion of correct receipt as an acknowledgment does not allow accurate computation of the graphics message transmission time and is not an effective aid for the presenter due to the latency of the acknowledgment, itself, and the potentially significant processing overhead to compute transmission times for each participant. Additionally, acknowledgment of reception does not include the variable time for rendering the image which, as noted above, can be highly variable. That is, even providing confirmation to the presenter that an image is visible to all participants is only possible at a time significantly later than the time the image actually becomes visible to particular participants. Even acknowledgment of the performance or status of rendering and/or presentation as disclosed in U.S. Published Patent Application 2006/0271624 is not fully successful in allowing good synchronization to be achieved due to the latency of the acknowledgment and the distraction attendant upon the display of a graphic image while discussion of a previous graphic image continues, as alluded to above. None of the above proposed arrangements address the problem of ensuring that synchronization is maximized for a particular participant or group of participants or seeks to provide the presenter with easily used tools to exploit the skill of the presenter to enhance synchronization for such a participant or group of participants that can be flexibly and easily used or altered during the presentation with minimal burden on the presenter.

The inventors have recognized that many of the shortcomings of previously proposed approaches to the problem of web conference synchronization derive from the various sources of latency that are substantially inherent therein. The inventors have also recognized that the presenter must be able to accurately anticipate the point in time when a given graphic is presented to participants and, importantly, one or more particular participants for whom it is particularly desirable that synchronization be optimal. Accordingly, while using mechanisms that may be superficially similar to some mechanisms utilized in previous proposals, the invention represents a substantial departure therefrom and has been found to be particularly effective and easy to use for achieving substantial synchronization of a web conference for at least participants for whom good synchronization may be particularly important.

Figure 2:
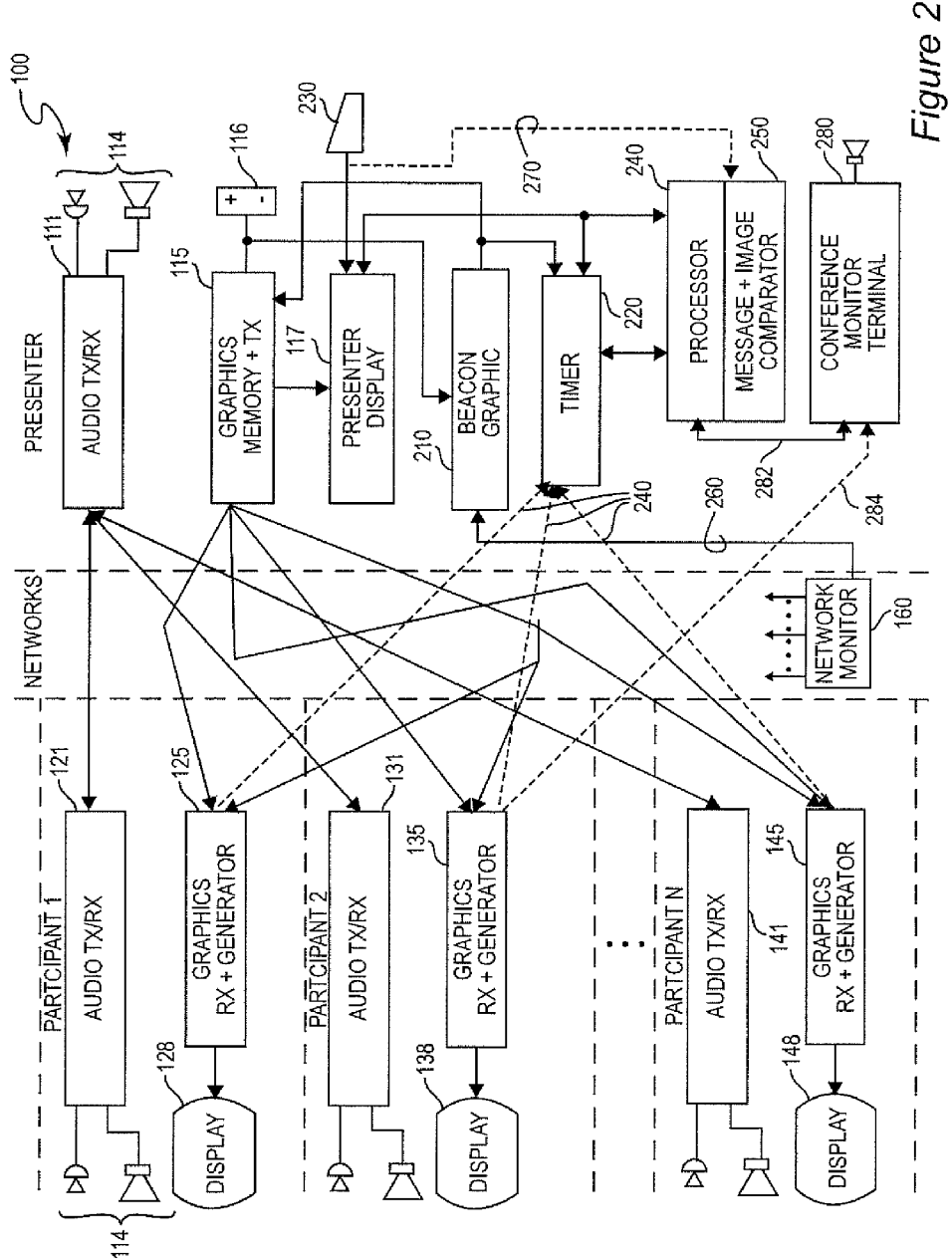
FIG. 2 is a schematic diagram of communications and data flows in accordance with the invention.

Referring now to FIG. 2, the invention and perfecting features thereof will now be discussed in detail. It can be readily seen from a comparison of FIG. 2 with FIG. 1 that the invention additionally provides a generator 210 for a particular graphic image, accompanied by a small amount of software that causes a receipt acknowledgment of the image to be sent to the presenter station. This particular message is referred to hereinafter as a beacon. The particular graphic image comprising the beacon is arbitrary and of no importance to the successful practice of the invention. However, it is generally preferred that the beacon image be of relatively low complexity, preferably in the form of a chart or the like, such that it can be rendered quickly since additional timing information can be derived therefrom and utilized more easily, as will be discussed in greater detail below. It is important, however, that the same beacon image be used for the duration of a given web conference. The software included in the beacon message, in addition to causing an acknowledgment to be sent, preferably causes the image to be rendered but display of the beacon image to be suppressed.

Compared with FIG. 1, the invention also includes an interval timer 220, a selection device 230, which may be a keyboard, mouse, light-pen, trackball, touch screen or the like or any combination thereof and a processor 240, preferably including, as a perfecting feature of the basic invention, a comparator 250 for comparing length of an image message and, preferably, relative complexity of the image as compared with the length and complexity of the beacon image for scaling the estimated transmission and/or rendering time for a given image from the measurement made using the beacon signal. It should be understood that all of the beacon graphic generator 210, timer 220, and selection device 230 could be and preferably are provided by suitable programming of processor 240.

As a further, optional perfecting feature of the invention, a conference monitor terminal 280 can be provided substantially in parallel with the presenter station and processor as depicted by bidirectional arrow 282 alternatively or additionally, the conference monitor terminal can receive status information from and be operated essentially in parallel with one or more selected participant stations as depicted by dashed arrow 284. These communications and operations allow a person other than the presenter to monitor the progress of the web conference and to intervene if any significant lack of synchronization is observed or even to assist the presenter with, for example, calling for web conference images or changing selection of participants to establish timing of portions of the conference presentation, as discussed above.

The basic principle of operation of the invention is to use the consistent beacon graphic image to make an approximate measurement of transmission time to respective participant stations. Use of a consistent image message allows many of the sources of variation in transmission time, such as image message length, to be eliminated and the estimated time of transmission and rendering of potentially longer image messages corresponding to web conference images of arbitrary complexity to be scaled thereto. The time intervals for the transmission and possible portion of rendering are then displayed to the presenter to provide for selection of an estimated time interval to be used for the web conference or portion thereof (e.g. a worst case time for an image to be transmitted to and rendered at all participant stations or a corresponding interval for a particular participant or group of participants) to be performed easily by the presenter. The time interval for transmission, which may include part or all of the rendering time for the beacon image, thus selected by the presenter, is then used to estimate the transmission time, possibly including a corresponding portion of rendering time, for the graphics included in the web conference. An indication is then displayed to the presenter when the selected time estimate interval following transmission of a web conference image has elapsed and the web conference image is assumed to be visible to all or selected participants. Importantly, since the invention uses a beacon signal at the outset of or before the web conference and/or during the web conference to derive an estimate of the transmission time of an image to particular participants, the estimate is available prior to transmission of an image so that the presented can order transmission of an image at a time suitably prior to conclusion of a discussion of the prior image as well as being informed in real time of when the most recently transmitted image should be visible to all or selected participants. Accordingly, the time of actual visibility can usually be held to a duration of a few seconds or less by the presenter; allowing the presentation to be conducted much more smoothly and expeditiously and substantially without distractions caused by the communication infrastructure.

Figure 3:
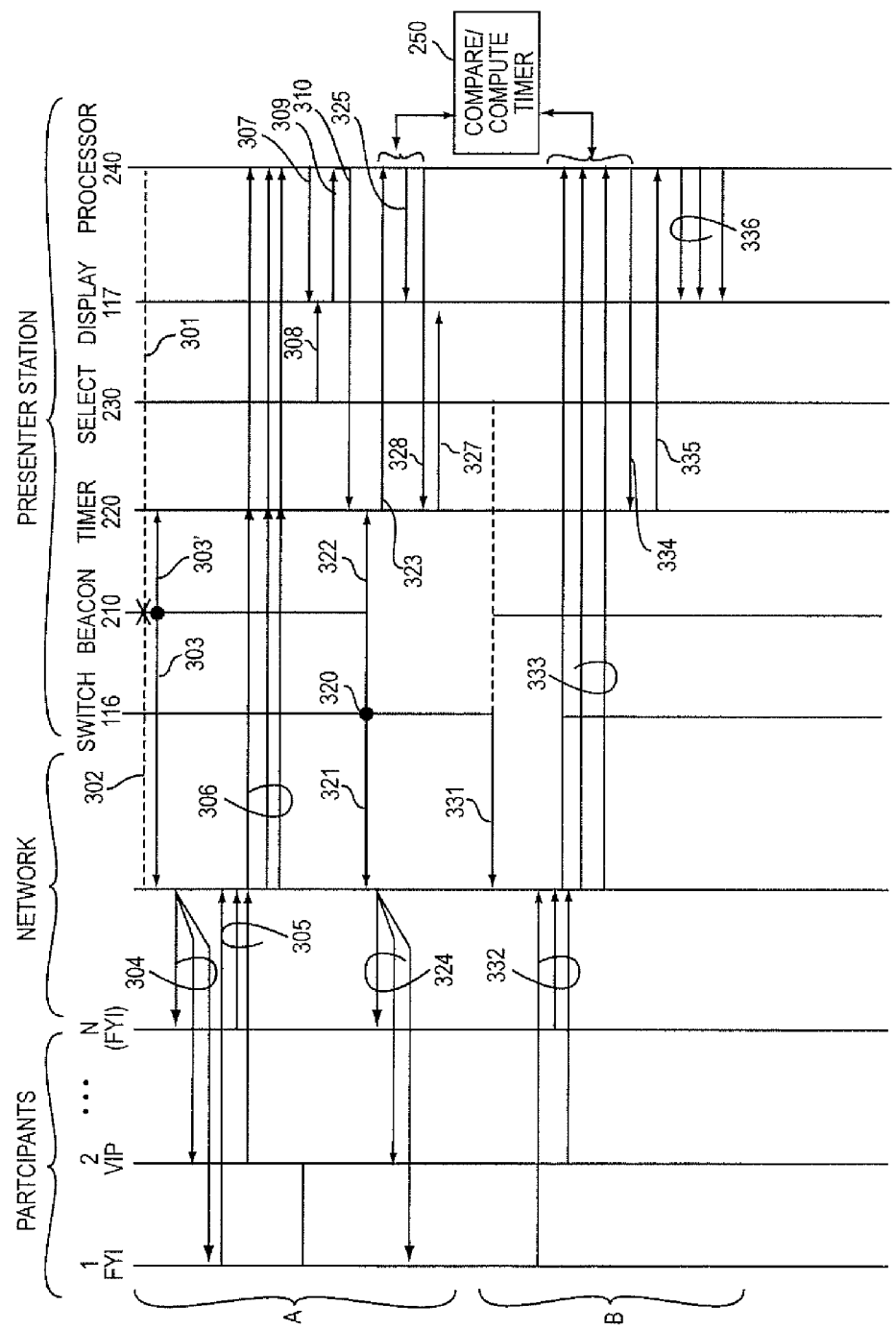
FIG. 3 illustrates a time-line of communications over a network and within the presenter station of a web conference in accordance with the invention.

More specifically and with reference to FIG. 3 as well as FIG. 2, the operation of the invention will now be described. FIG. 3 should be understood as a plurality of time lines, each running vertically downward in two separate phases of operation identified by brackets A and B. Bracket A indicates the operation of the invention to provide the basic functions of allowing the presenter to easily configure the timer estimation of web conference image presentation to the network and processor conditions for any or all participants and to indicate to the presenter when a particular web conference image should be visible to the selected participant(s) so that the presenter will know when the discussion of that web conference image can begin with little, if any, perceptible lack of synchronization. Bracket B indicates optional but preferred additional communications which provide inclusion of an estimate of image rendering time at individual participant stations. Arrows depicted in FIG. 3 indicate communications to and from participants 1, 2, . . . , N and the network and to and from elements 210-240 within the presenter station.

The operation of the invention can preferably be invoked in at least two ways. Dashed arrow 301 indicates an operation during initiation of operation of processor 240 or initiation of the web conference communicating with beacon generator 210 to cause transmission of a beacon signal to the network. Alternatively, as alluded to above, network monitor monitors the status and control of the network for efficient utilization and performs corresponding control of message routing. Therefore, it is also desirable to monitor changes in network load and status and in routing of messages by the network to invoke operation of the invention when it is likely that changes in network routing will alter message transmission time intervals. Thus, dashed arrow 302 depicts a communication over connection 260 of FIG. 2 indicating a change in network control to beacon generator 210 to cause transmission of a beacon message. The transmission of the beacon message from the presenter station to the network is depicted by arrow 303. The timing of sending of the beacon message is sent to timer 220, preferably in the form of a time stamp, as depicted at 303'. Arrows 304 indicate transmission of the beacon message through the network to the respective participant stations and are depicted as diverging to indicate the different latency due to the different routing of respective messages (e.g. the beacon image message or other image messages) by the network as alluded to above. The beacon messages thus arrive at respective participant stations at different times and acknowledgment messages generated by the software included in the beacon message are returned with different latencies within the respective participant stations, as depicted by the respective differently timed starting points of arrows 305. The acknowledgment messages presumably will have different latencies within the network as depicted by differing separations of arrows 306. The acknowledgment messages 306 are preferably in the form of a time stamp for the time of receipt of the beacon messages which are sent to timer 220 and/or processor 240. Processor 240 then controls display of the respective transmission times to the respective participant stations as depicted by arrow 307.

Figure 4:
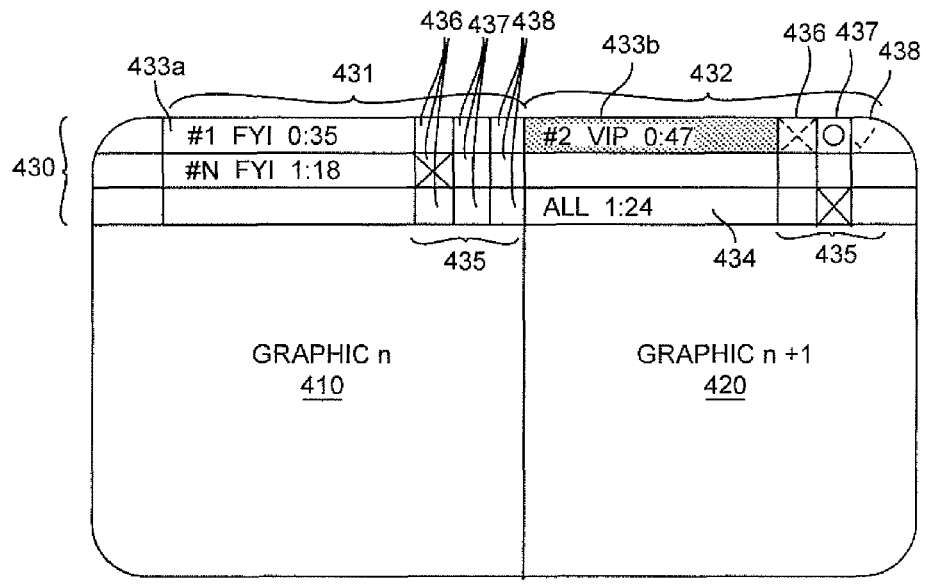
FIG. 4 is a preferred screen layout for indicia to a teleconference presenter or conference monitor and suitable for practice of the invention.

Using the resulting display, the presenter can then select, as depicted by arrow 308, a transmission time interval that will be used to estimate the transmission and/or rendering time for later web conference images. The display of transmission time is preferably in the form of a menu as depicted in FIG. 4 from which the presenter can select using a keyboard, touch screen, mouse or the like type of selection device 230. As alluded to above, the presenter can easily select a worst case transmission time or the transmission time for a particular participant or group of participants, such as potential customers, for whom it may be important that any lack of synchronization be minimized. Such persons are designated "VIP" in FIG. 3 as distinct from participants for whom lack of synchronization is considered less important (e.g. persons participating only to evaluate content or for their own information) and which are designated "FYI" in FIG. 3. The selected transmission time interval is then communicated to processor 240 as indicated by arrow 309.

Processor 240 then computes an estimated transmission time for images to be used during the web conference. This computation can be done in several ways. For example, if the web conference images are of comparable complexity to the beacon image and the image message length is also comparable to that of the beacon message, the time interval for receipt of the beacon message by all or particular participants may be used directly without further computation or a further constant estimated interval can be added to the interval determined using the beacon. If the message length and/or image complexity is significantly greater than that of the beacon message and/or image, the interval determined using the beacon can be scaled and/or augmented accordingly. Optionally, a facility can be provided to allow the presenter to exercise a degree of control over the amount of time scaling and/or augmentation provided as indicated by dashed line 270 in FIG. 2.

It should be appreciated that the communications and presenter selections discussed above determine a representative transmission time only for the beacon image and does not include rendering time, if, in fact, the beacon image is to be displayed at all from the signals generated by the rendering process since it is preferred that the beacon image be suppressed (so that operation of the invention will be transparent to participants) although some useful information can optionally be derived from performing the processing for rendering the beacon image. However, importantly, approximate transmission times have been derived for all participants and the presenter has been enabled to select either a worst case transmission time or the transmission time for an individual participant or group of participants in a very simple manner. The beacon transmission time interval, since it preferably does not include rendering time thus provides an approximation of how far in advance the presenter will need to call for the transmission of a web conference image so that at least the message will have arrived at selected participant stations to be rendered to be available for presentation to participants. Thus, the invention allows the presenter to anticipate the latency and time requirements of at least the network in calling the web conference images in sequence and thus to limit the lack of synchronism to approximately the time required for image rendering for at least the VIP participants.

The use of the invention for synchronization of the web conference begins at point/time 320 of FIG. 3 when the presenter actuates switch 116 to call for a web conference image to be transmitted. (Of course, the web conference images could be transmitted in advance and only a control for presentation transmitted, in which case, the beacon signal transmission time may be slightly longer than the control signal transmission time but still likely to be at least slightly shorter than the time for presentation of a web conference image to a selected participant, group of participants or all participants, as selected.) The transmission of a web conference image (or control for its display) to the network is depicted at 321 of FIG. 3. At the same time, a signal 322 indicating that transmission is also transmitted to the timer and is relayed at the same or a slightly later (e.g. by the beacon signal transmission time interval) time to the processor 240, as depicted at 323, where the image will preferably be rendered from data in local memory for display at presenter display 117 responsive to communication 325. While rendering can be done in advance for any or all web conference images, it is preferred that rendering time for respective web conference images be monitored and maintained for possible scaling and/or augmentation of the time estimation of when the image will be available to respective participants as will be discussed in greater detail below. During this time period for communications and processes depicted at 322, 323 and 325, the web conference image messages are being sent, with diverging transmission times over the network to the respective participant stations, as depicted at 324, where the respective web conference images will be rendered and displayed in due course.

As alluded to above, the respective web conference image message lengths and/or image complexity/rendering time can be compared with the beacon image message length and image complexity/rendering time at comparator 250 and the selected beacon transmission time can be scaled and/or augmented as may be appropriate, as discussed above. This estimate of total time for display of images at the respective participant stations is transmitted to display 117 as depicted at 325 and to timer 220 as depicted at 326. The progress of the running of the display interval so scaled and/or augmented is tracked by timer 220 and the result returned to presenter display 117.

The estimate of rendering time and the ability of the presenter to accurately anticipate the visibility of a given web conference image can be enhanced by the additional communications and processing indicated by bracket B in FIG. 3. Arrow 331 indicate the transmission of additional software or application (which may also be included within the beacon message 303) to the individual participant stations to cause the participant stations to transmit a signal 332 to the presenter station when rendering of the beacon image and/or a web conference image is begun and/or completed. Latency of transmission 331 is unimportant to the practice of the invention since the latency of the beacon message transmission has been determined as discussed above and since transmission 331 can be transmitted prior to or following the beacon message or, for that matter, before, after or concurrently with any particular web conference image. Transmissions 332 are relayed through the network to processor 240 and comparator 250 so that the beginning of the rendering process can be used to derive an additional set point for the timer 220. That is, a representative rendering time can be derived from the beacon image rendering time and information in regard to adjustments (e.g. scaling and/or augmentation) to the representative rendering time can be derived from the rendering time(s) of web conference images that may be or greater or lesser complexity than the beacon image. Further, transmission of a signal when rendering is begun also allows evaluation of any data latency in the individual participant stations between image data reception and the rendering process. This additional information is provided to the timer 220 in communication 334 to allow tracking of additional potential latency periods. Perhaps even more importantly, a message 332 transmitted when rendering is begun allows additional information to be supplied to the presenter by communication from timer 220 to processor 240 as shown at 335 and thence to the display 117 as shown at 336 for aiding the presenter to adjust the timing of the segments of the presentation that correspond to respective web images, as will be discussed in greater detail below.

Figure 5:
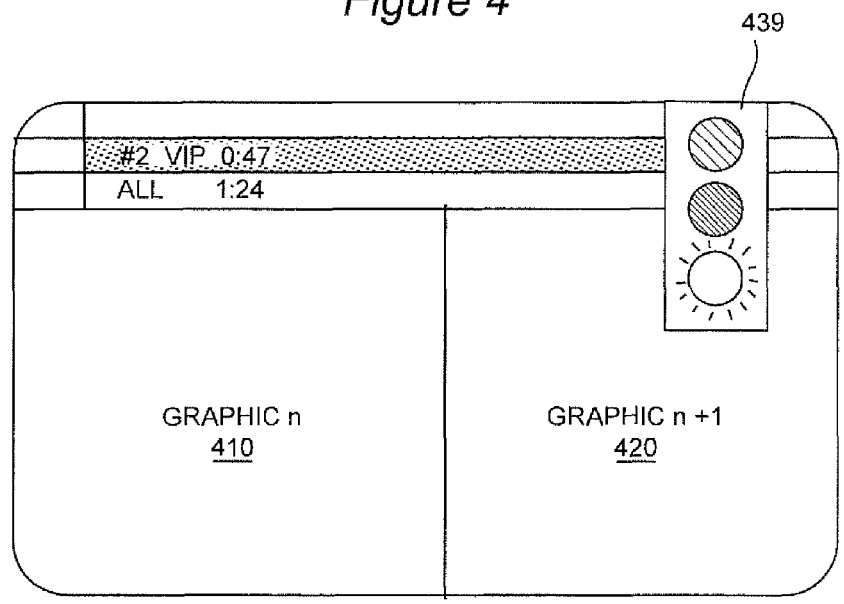
FIG. 5 is an alternative screen layout for indicia to a teleconference presenter or conference monitor usable with a screen layout such as that of FIG. 4.

As depicted in FIG. 4, a split screen display preferred for practice of the present invention is shown. Major portions of the display screen 410, 420 are used for display of the rendered current web conference image (image n, 410) and the next web conference image (image n+1. 420). A section 430 of the screen, shown, for example, at the top of the screen illustrated in FIG. 4 is used for display, preferably in the form a tabular menu, the participants in the web conference. The VIP participants and the FYI participants are preferably separated for ease of viewing by the presenter, for example, in columns 432, 431 on the right and left sides of the top portion of the display. A separate line 433*a*, 433*b* is preferably provided for each participant and a line 434 is preferably allocated as a summary for all participants (e.g. the worst case time for display of a web conference image to all participants). A beacon message transmission time, whether or not scaled or augmented as discussed above, is preferably displayed for each participant. A selection made by the presenter as discussed above can be indicated by one or more attributes for the display of a particular line of section 430, which are collectively illustrated by stippling of line 433*b* in FIG. 4. Status indicators 435, preferably in the form of at least two columns of areas and/or icons, are preferably provided. It should be understood that only the display portion 430 is sufficient to allow selection of the estimated transmission interval by the presenter and, thereafter, a much simpler display, possibly comprising a single status indication 435 or 439 of FIG. 5 corresponding to the selected transmission time, is sufficient for coordinating synchronization by the presenter (with all or some of the other information deleted and the status indicator enlarged) and may be preferred for visibility by some users. For example, in the simplified screen image of FIG. 5, while the graphics images 410 and 420 remain illustrated, the display 430 is substantially condensed to show only the selected VIP participant and a single alternative for possible selection and with a single, enlarged status indicator 439 which can preferably have the appearance of a traffic signal. (An enlarged indicator with a change in status resulting in a change of visual appearance of more than one attribute, in this case both color and position of illuminated area is considered to be more readily perceptible in the peripheral visual field of the presenter.) However, it is contemplated that the presenter may wish to change a previously made selection (e.g. to switch to worst case timing for some web conference images) during a web conference and the preferred display format of FIG. 4 allows full control of the invention at all times without any need to change or switch display formats.

In the exemplary display of FIG. 4, the beacon signal transmission time is thirty-five seconds for participant #1 (a FYI participant), forty-seven seconds for participant #2 (a VIP participant; the transmission time for which has been selected) and one minute, eighteen seconds for participant #N (also a FYI participant). The timer status displays 435, as illustrated in FIG. 4, represent the state of the system at a time about forty-five seconds after the presenter has actuated switch 116 to transmit or call for a web conference image. Accordingly, status indicator 438 (e.g. a green lighted area or an "already displayed" icon such as a check mark) will be displayed for FYI participant 1 for which a thirty-five second latency has already elapsed. Conversely, for FYI participant N, a status indicator 436 (e.g. a red lighted area or a "not ready" icon) will be displayed since the one minute, eighteen second latency has not elapsed has the image is not visible to that participant. Thus two status indicator attributes are sufficient to the successful practice of the invention in accordance with its basic principles.

However, as alluded to above, if the additional, optional communications indicated by bracket B of FIG. 3 are preformed, as is preferred, a third status attribute (e.g. a yellow lighted or blinking area or "display imminent" icon) 437 can be employed to indicate that the web conference image displayed to a given participant is about to change to the web conference image the presenter has directed shortly before. This indication allows the presenter to complete the discussion of the previous web conference image so that the discussion of the next sequential image can begin promptly when the image becomes visible to a given participant such as the selected VIP participant 2. Thus the presenter may even more accurately synchronize the discussion to the respective web conference images as they are presented to participants.

In view of the foregoing, it is seen that the invention provides an easily used tool that allows a web conference presenter to accurately synchronize the content of a real-time communication channel with the content of an image or graphics channel in which various amounts of latency are inherent without engendering excess delay and to do so with high accuracy for a freely selectable participant or group of participants. By providing adjustable estimates of times when images will become visible to participants through measurements made with a standard beacon message by tracking elapsed time from transmission of an image or a control signal, the invention provides an essentially real-time indication to a web conference presenter of when an image will be visible to a participant and allowing the presented to anticipate when that moment will occur such that the presenter can adjust timing of respective segments of the presentation. Preferred perfecting features of the invention which are not necessary to its successful practice in accordance with its most basic principles allow automatic re-evaluation of latency upon the occurrence of changes in network status and for change of participant selection in response thereto as well as allowing all significant sources of latency (e.g. image transmission, network status, image and message length and complexity, image rendering, differences in participant station software processes and processing power and latency between data reception and rendering) to be accounted for and potentially compensated. Conference monitoring and control by a person other than the presenter as well as possible direct monitoring of the conference at a selected participant station is also optionally provided as a perfecting feature of the invention. Moreover, the invention allows the change of images visible to a participant to be accurately anticipated so that any lack of synchronization of content over the real-time communication link can be accurately minimized and made generally imperceptible.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method for synchronizing presentation of content of a web conference over a real-time communication link with content over another communication link which includes data latency, said method including
   transmission of a beacon message containing image data and software for transmitting an acknowledgment of receipt of said image data to determine approximate latency time of said another communication link,
   sending a web conference image,
   determining elapsed time subsequent to said sending of said web conference image, and
   displaying an indication to a web conference presenter when said elapsed time equals or exceeds a time corresponding to said approximate latency time.

2. A method as recited in claim 1, including the further step of
   displaying said indication to a web conference monitor.

3. A method as recited in claim 2, including the further step of
   displaying an indication to a web conference presenter when said elapsed time approaches a time corresponding to said approximate latency time.

4. A method as recited in claim 2, including the further step of comparing a parameter of said web conference image to a corresponding parameter of said beacon message.

5. A method as recited in claim 4, wherein said parameter of said web conference includes a includes message length or image complexity.

6. A method as recited in claim 4, including the further step of adjusting said approximate latency is scaled and/or augmented based on a result of said comparing step.

7. A method as recited in claim 2, including a further steps of
   monitoring said another communication link, and
   repeating said step of transmission of a beacon message when said monitoring step detects a change in said another communication link.

8. A method as recited in claim 2, including the further step of selecting an approximate latency time corresponding to a participant in said web conference.

9. A method as recited in claim 2, wherein said indication to a web conference presenter comprises a change in visual appearance of a display area or icon.

10. A method as recited in claim 2, wherein said indication to a web conference presenter is in the form of an image of a traffic signal.

11. A method as recited in claim 1, including the further step of
    displaying an indication to a web conference presenter when said elapsed time approaches a time corresponding to said approximate latency time.

12. A method as recited in claim 1, including the further step of comparing a parameter of said web conference image to a corresponding parameter of said beacon message.

13. A method as recited in claim 12, wherein said parameter of said web conference includes a includes message length or image complexity.

14. A method as recited in claim 12, including the further step of adjusting said approximate latency is scaled and/or augmented based on a result of said comparing step.

15. A method as recited in claim 1, including a further steps of
    monitoring said another communication link, and
    repeating said step of transmission of a beacon message when said monitoring step detects a change in said another communication link.

16. A method as recited in claim 1, including the further step of selecting an approximate latency time corresponding to a participant in said web conference.

17. A method as recited in claim 1, wherein said indication to a web conference presenter comprises a change in visual appearance of a display area or icon.

18. A method as recited in claim 1, wherein said indication to a web conference presenter is in the form of an image of a traffic signal.

19. Apparatus for conducting a web conference comprising
    a transmitter to transmit an audio portion of said web conference over a communication link,
    a transmitter to transmit image information of said web conference over another communication link exhibiting latency,
    a generator to transmit a beacon signal over said another communication link,
    a processor to determine approximate latency of said beacon signal in said another communication link,
    a timer for measuring elapsed time from transmission of said image information, and
    a display, responsive to said timer for indicating when said elapsed time equals or exceeds said approximate latency.

20. A method for synchronizing presentation of content of a web conference over a real-time communication link with content over another communication link which includes data latency, said method including
    configuring a data processor to provide a transmitter to transmit image information of said web conference over another communication link exhibiting latency,
    configuring a data processor to provide a generator to transmit a beacon signal over said another communication link,
    configuring a data processor to provide a processor to determine approximate latency of said beacon signal in said another communication link,
    configuring a data processor to provide a timer for measuring elapsed time from transmission of said image information, and
    displaying, responsive to said timer, an indication of when said elapsed time equals or exceeds said approximate latency.

* * * * *